US008586649B2

(12) United States Patent
Uradnisheck

(10) Patent No.: US 8,586,649 B2
(45) Date of Patent: Nov. 19, 2013

(54) POLY(HYDROXYALKANOIC ACID) AND ARTICLES THEREWITH

(75) Inventor: Julius Uradnisheck, Glen Mills, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 1164 days.

(21) Appl. No.: 12/136,510

(22) Filed: Jun. 10, 2008

(65) Prior Publication Data

US 2008/0306185 A1 Dec. 11, 2008

Related U.S. Application Data

(60) Provisional application No. 60/934,050, filed on Jun. 11, 2007.

(51) Int. Cl.
*C09D 151/04* (2006.01)
*C08K 5/09* (2006.01)
*C08G 63/08* (2006.01)

(52) U.S. Cl.
USPC ........... 523/201; 524/284; 524/300; 524/315; 524/316; 524/318; 524/322; 524/500; 524/502; 524/539; 524/599; 524/606

(58) Field of Classification Search
USPC ......... 524/284, 300, 315, 316, 318, 322, 500, 524/502, 539, 599, 606; 523/201
See application file for complete search history.

(56) References Cited

U.S. PATENT DOCUMENTS

| | | | |
|---|---|---|---|
| 5,443,780 A | 8/1995 | Matsumoto | |
| 5,914,188 A * | 6/1999 | Kobayashi et al. | ........... 428/331 |
| 6,114,495 A | 9/2000 | Kolstad | |
| 6,323,308 B1 | 11/2001 | Kobayashi | |
| 6,417,294 B1 * | 7/2002 | Obuchi et al. | ................. 525/450 |
| 6,803,443 B1 | 10/2004 | Ariga et al. | |
| 6,943,214 B2 | 9/2005 | Flexman | |
| 7,175,917 B2 | 2/2007 | Sukigara | |
| 2004/0230001 A1 * | 11/2004 | Flexman | ........................ 525/154 |
| 2004/0242803 A1 * | 12/2004 | Ohme et al. | .................. 525/400 |
| 2006/0148917 A1 * | 7/2006 | Radwanski et al. | ............ 521/99 |
| 2008/0071015 A1 | 3/2008 | Kiuchi | |

FOREIGN PATENT DOCUMENTS

| | | |
|---|---|---|
| DE | 4102170 A | 8/1992 |
| EP | 1826241 A1 | 8/2007 |
| JP | 02-166154 A | 6/1990 |
| JP | 07-188537 A | 7/1995 |
| JP | 07188537 A | 7/1995 |
| JP | H06 160314 * | 1/1996 |
| JP | H06-160314 A1 | 1/1996 |
| JP | H09-286909 A1 | 11/1997 |
| JP | H11-240962 A1 | 9/1999 |
| JP | 2002-146170 A1 | 5/2002 |
| JP | 2007-119730 A | 5/2007 |
| JP | 2007-145937 A1 | 6/2007 |
| WO | 0023520 A1 | 4/2000 |
| WO | 03014224 A2 | 2/2003 |
| WO | 03082980 A1 | 10/2003 |
| WO | 2004101642 A1 | 11/2004 |
| WO | 2005/059031 A1 | 6/2005 |

OTHER PUBLICATIONS

Pluta, Polymer 45 (2004) 8239-8251.*

* cited by examiner

*Primary Examiner* — Robert C Boyle

(57) ABSTRACT

Disclosed is a composition comprising poly(hydroxyalkanoic acid) and one or more carboxylic acids having about 10 to about 30 carbon atoms wherein the carboxylic acid is present in the composition from 0.5 to about 15%, based on the weight of the composition and the carboxylic acid includes aromatic carboxylic acid, aliphatic carboxylic acid, polycarboxylic acid, aliphatic hydroxycarboxylic acid; or combinations of two or more thereof. Also disclosed are a process that can be used for producing the composition and an article comprising the composition.

18 Claims, No Drawings

POLY(HYDROXYALKANOIC ACID) AND ARTICLES THEREWITH

This application claims priority to US provisional application Ser. No. 60/934,050, filed Jun. 11, 2007; the entire disclosure of which is incorporated herein by reference.

The invention relates to a composition comprising Poly (hydroxyalkanoic acid) and a carboxylic acid, to a process for increasing crystallization of the composition, and to an article comprising the composition.

BACKGROUND OF THE INVENTION

Poly(hydroxyalkanoic acid) (PHA) such as polylactic acid (PLA) is a resin comprising renewable monomer such as production by bacterial fermentation processes or isolated from plant matter that include corn or sweet potatoes. The resin can be used for thermoformed packaging articles such as cups, trays, and clam shells. Generally, the resin is first extruded into an amorphous sheet and formed at about 100° C. into finished articles. The un-oriented sections of the articles do not fully crystallize because PLA crystallizes too slowly in high speed thermoforming equipment. As PLA grades popular for thermoforming have a Tg of 55° C., the thermoformed article may start to crystallize during storage if the temperature is near and above 55° C. Crystallization causes the articles to wrap and self-stick. Protection of PLA articles from 55° C. is not practical because shipping trucks experience 65° C. or higher. Furthermore if PLA is to be useful with hot-fill foods, it must resist deformation at about 80° C.

One may anneal articles such as cups in the molds but doing so may greatly increase the cost for making the articles. A preferred method is to increase the crystallinity or rate of crystallization by use of a nucleator for PLA. Many nucleators exist such as talc, sodium salt of saccharin, calcium silicate, sodium benzoate, calcium titanate, boron nitride, copper phthalocyanine, isotactic polypropylene, low molecular weight poly(lactide) and polybutylene terephthalate, but are not used because the nucleators introduce haze or opacity to the otherwise transparent PLA articles or organoleptics thereby impairing the value of the articles. See, e.g., U.S. Pat. Nos. 6,114,495, 6,417,294, and WO 03014224.

Therefore, there is a need to crystallize PLA during thermoforming at a reasonably fast rate without introducing haze or other objectionable properties to enable one to process PLA into articles wherein the un-oriented portion of the article crystallizes at such fast rate thereby providing heat resistance above the glass transition temperature of the PHA.

SUMMARY OF THE INVENTION

A composition comprises, consists essentially of, consists of, or produced from, poly(hydroxyalkanoic acid) and one or more carboxylic acids having about 10 to about 30 carbon atoms.

A process comprises contacting a poly(hydroxyalkanoic acid) composition or poly(hydroxyalkanoic acid) with a nucleator to produce a compound and thermoforming the compound into an article.

DETAILED DESCRIPTION OF THE INVENTION

PHA compositions include polymers comprising repeat units derived from one or more hydroxyalkanoic acids having 2 to 15, 2 to 10, 2 to 7, or 2 to 5, carbon atoms. Examples include glycolic acid, lactic acid, 3-hydroxypropionate, 2-hydroxybutyrate, 3-hydroxybutyrate, 4-hydroxybutyrate, 3-hydroxyvalerate, 4-hydroxyvalerate, 5-hydroxyvalerate, 6-hydroxyhexanoic acid, 3-hydroxyhexanoic acid, 4-hydroxyhexanoic acid, 3-hydroxyheptanoic acid, or combinations of two or more thereof. Examples of polymers include poly(glycolic acid) (PGA), poly(lactic acid) (PLA) and poly(hydroxybutyrate) (PHB), polycaprolactone (PCL), or combinations of two or more thereof, including blends of two or more PHA polymers (e.g., blend of PHB and PCL).

PHA can be produced by bulk polymerization. A PHA may be synthesized through the dehydration-polycondensation of the hydroxyalkanoic acid. A PHA may also be synthesized through the dealcoholization-polycondensation of an alkyl ester of polyglycolic acid or by ring-opening polymerization of a cyclic derivative such as the corresponding lactone or cyclic dimeric ester. The bulk polymerization can be carried out by two production processes, i.e., a continuous process and a batch process. Japanese patent application JP03-502115A discloses a process wherein bulk polymerization for cyclic esters is carried out in a twin-screw extruder. JP07-26001A discloses a process for the polymerization for biodegradable polymers, wherein a bimolecular cyclic ester of hydroxycarboxylic acid and one or more lactones are continuously fed to a continuous reaction apparatus having a static mixer for ring-opening polymerization. JP07-53684A discloses a process for the continuous polymerization for aliphatic polyesters, wherein a cyclic dimer of hydroxycarboxylic acid is fed together with a catalyst to an initial polymerization step, and then continuously fed to a subsequent polymerization step built up of a multiple screw kneader. U.S. Pat. No. 2,668,162 and U.S. Pat. No. 3,297,033 disclose batch processes.

PHA also includes copolymers comprising more than one PHA, such as polyhydroxybutyrate-hydroxyvalerate (PHBN) copolymers and copolymers of glycolic acid and lactic acid (PGA/LA). Copolymers can be produced by copolymerization of a polyhydroxyalkanoic acid or derivative with one or more cyclic esters and/or dimeric cyclic esters. Such comonomers include glycolide(1,4-dioxane-2,5-dione), dimeric cyclic ester of glycolic acid, lactide(3,6-dimethyl-1,4-dioxane-2,5-dione), α,α-dimethyl-β-propiolactone, cyclic ester of 2,2-dimethyl-3-hydroxypropanoic acid, β-butyrolactone, cyclic ester of 3-hydroxybutyric acid, δ-valerolactone, cyclic ester of 5-hydroxypentanoic acid, ε-caprolactone, cyclic ester of 6-hydroxyhexanoic acid, and lactone of its methyl substituted derivatives, such as 2-methyl-6-hydroxyhexanoic acid, 3-methyl-6-hydroxyhexanoic acid, 4-methyl-6-hydroxyhexanoic acid, 3,3,5-trimethyl-6-hydroxyhexanoic acid, etc., cyclic ester of 12-hydroxy-dodecanoic acid, and 2-p-dioxanone, cyclic ester of 2-(2-hydroxyethyl)-glycolic acid, or combinations of two or more thereof.

PHA compositions also include copolymers of one or more PHA monomers or derivatives with other comonomers, including aliphatic and aromatic diacid and diol monomers such as succinic acid, adipic acid, and terephthalic acid and ethylene glycol, 1,3-propanediol, and 1,4-butanediol. About 100 different comonomers have been incorporated into PHA polymers. Generally, copolymers having the more moles of comonomer(s) incorporated, the less likely the resulting copolymer is to crystallize. If the copolymer does not crystallize when precipitated out of its soluble solution in some organic solvent, it cannot not crystallize when it is melt-blended with a nucleator.

PHA polymers and copolymers may also be made by living organisms or isolated from plant matter. Numerous microorganisms have the ability to accumulate intracellular reserves of PHA polymers. For example, copolymer poly(3-hydroxybutyrate-co-3-hydroxyvalerate) (PHB/V) has been produced by fermentation of the bacterium *Ralstonia eutropha*. Fermentation and recovery processes for other PHA types have also been developed using a range of bacteria including *Azotobacter, Alcaligenes latus, Comamonas testosterone* and genetically engineered *E. coli* and *Klebsiella*. U.S. Pat. No. 6,323,010 discloses a number of PHA copolymers prepared from genetically modified organisms.

Glycolic acid is derived from sugar cane. Poly(glycolic acid) can be synthesized by the ring-opening polymerization of glycolide and is sometimes referred to as poly-glycolide.

PLA includes poly(lactic acid) homopolymers and copolymers of lactic acid and other monomers containing at least 50 mole % (50% comonomer gives the least likely copolymer composition to crystallize, no matter what conditions) of repeat units derived from lactic acid or its derivatives (mixtures thereof) having a number average molecular weight of 3000 to 1000000, 10000 to 700000, or 20000 to 300000. PLA may contain at least 70 mole % of repeat units derived from (e.g. made by) lactic acid or its derivatives. The lactic acid monomer for PLA homopolymers and copolymers can be derived from d-lactic acid, l-lactic acid, or combinations thereof. A combination of two or more PLA polymers can be used. PLA may be produced by catalyzed ring-opening polymerization of the dimeric cyclic ester of lactic acid, which is frequently referred to as "lactide." As a result, PLA is also referred to as "polylactide."

PLA also includes the special class of copolymers and blends of different stereo-isomers of lactic acid or lactide. Melt blends of PLA polymerized from d-lactic acid or d-lactide and PLA polymerized from l-lactic acid or l-lactide can give a stereo-complex between the two stereopure PLAs at a 50/50 ratio. Crystals of the stereo-complex itself has a much higher melt point than either of the two PLA ingredients. Similarly stereo-block PLA can be solid state polymerized from low molecular weight stereo-complex PLA.

Copolymers of lactic acid are typically prepared by catalyzed copolymerization of lactic acid, lactide or another lactic acid derivative with one or more cyclic esters and/or dimeric cyclic esters as described above.

PHA may comprise up to about 99.8 weight %, of the composition, based on the total amount of PHA and nucleator used. For example, the PHA may be present in a range from a lower limit of 60, 70, 80, 85, 90 or 95 to an upper limit of 97, 99, 99.5 or 99.8 weight %.

Carboxylic acid can include aromatic carboxylic acid (e.g., benzoic acid); aliphatic carboxylic acid (e.g., unsaturated fatty acid such as oleic acid; saturated fatty acid such as stearic acid; fatty acid alcohol such as stearyl alcohol; fatty acid ester such as butyl stearate; and fatty acid amide such as stearamide); polycarboxylic acid; aliphatic hydroxycarboxylic acid; or combinations of two or more thereof. Wishing not to be bound by theory, film or sheet made from a PHA composition comprising fatty acid derivatives or long chain (e.g., ≥31 carbons) may be less optically clear due to possible difficulty in dispersing these compounds or due to less solubility of these compounds in PHA and due to a mismatch of refractive indices of the PHA and additives.

The carboxylic acids can be aliphatic, mono-functional (saturated, unsaturated, or multi-unsaturated) carboxylic acids thereof. The acid may have from about 10 to about 30, about 12 to about 28, about 16 to about 26, or 18 to 22, carbon atoms per molecule. Of particular interest re the acids that are on the US Food and Drug Administration (FDA) list as GRAS (generally regarded as safe). Examples of non-official GRAS acids include some mono- and some poly-carboxylic acids such as lactic acid, linoleic acid, malic acid, propionic acid, stearic acid, succinic acid, tannic acid, tartaric acid, or combinations of two or more thereof.

The carboxylic acids may have a low volatility (do not volatilize at temperatures of melt blending with PHA) when being melt-blended with PHA or have particles that can well dispersed in PHA such as those having diameters less than about 2μ or are non-migratory (do not bloom to the surface of PLA under normal storage conditions (ambient temperatures)). That is, a desired carboxylic acid has a boiling point higher than the melt processing temperature and pressure of PHA, which is disclosed elsewhere in the application. Examples of carboxylic acids include lauric acid, palmitic acid, stearic acid, behenic acid, erucic acid, oleic acid, linoleic acid, or combinations of two or more thereof.

The composition can comprise a crystallization-improving amount of the carboxylic acid when the composition is heated. The carboxylic acid can be present in the composition, by weight of the composition, from 0.5 to about 15, about 1 to about 10, 1.2 to 10, or 1.5 to 10%.

The composition may further comprise at least one optional cationic catalyst. Such catalysts are described in U.S. Pat. No. 4,912,167 and are sources of catalytic cations such as $Al^{3+}$, $Cd^{2+}$, $Co^{2+}$, $Cu^{2+}$, $Fe^{2+}$, $In^{3+}$, $Mn^{2+}$, $Nd^{3+}$, $Sb^{3+}$, $Sn^{2+}$, and $Zn^{2+}$. Suitable catalysts include, but are not limited to, salts of hydrocarbon mono-, di-, or poly-carboxylic acids, such as acetic acid and stearic acid. Inorganic salts such as carbonates may also be used. Examples of catalysts include, but are not limited to, stannous octanoate, zinc stearate, zinc carbonate, and zinc diacetate (hydrated or anhydrous). When used, the cationic catalyst may comprise about 0.01 to about 3 parts by weight per hundred parts by weight of PHA and impact modifier.

The composition can also include, by weight of the composition, about 0.01 to about 30, about 0.1 to about 20, or about 0.2 to about 10%, a toughening agent including an ethylene copolymer, a core-shell polymer, or combinations thereof.

An ethylene copolymer may comprise repeat units derived from (a) ethylene; (b) one or more olefins of the formula $CH_2=C(R^3)CO_2R^4$, where $R^3$ is hydrogen or an alkyl group with 1 to 6 carbon atoms, such as methyl, and $R^4$ is glycidyl; and optionally (c) one or more olefins of the formula $CH_2=C(R^1)CO_2R^2$, or carbon monoxide where $R^1$ is hydrogen or an alkyl group with 1 to 8 carbon atoms and $R^2$ is an alkyl group with 1 to 8 carbon atoms, such as methyl, ethyl, or butyl. Repeat units derived from monomer (a) may comprise, based on the copolymer weight, from about 20, 40 or 50% to about 80, 90 or 95%. Repeat units derived from monomer (b) may comprise, based on the copolymer weight, from about 0.5, 2 or 3% to about 17, 20, or 25%. An example of the ethylene copolymer derived from ethylene and glycidyl methacrylate and is referred to as EGMA. Optional monomers (c) can be butyl acrylates or CO. One or more of n-butyl acrylate, tert-butyl acrylate, iso-butyl acrylate, and sec-butyl acrylate may be used. An example of the ethylene copolymer is derived from ethylene, butyl acrylate, and glycidyl methacrylate and is referred to as EBAGMA. Repeat units derived from monomer (c), when present, may comprise, based on the copolymer weight, from about 3, 15 or 20% to about 35, 40 or 70%.

If an ethylene copolymer is present in the composition, the carboxylic acid can be in the form of an alkyl ester or an alkyamide where the alkyl group has 4 to about 30 or 10 to about 20 carbon atoms.

The ethylene copolymers can be prepared by methods well known to one skilled in the art, which is omitted herein for the interest of brevity.

A core/shell polymer may not comprise a vinyl aromatic comonomer, and have a refractive index not greater than 1.5; the core comprises one or more elastomers that may comprise polyalkyl acrylate and be optionally cross-linked; the shell comprises non-elastomeric polymer that may include polymethyl methacrylate and optionally contain functional groups including epoxy, carboxylic acid, or amine.

A core-shell polymer may be made up of multiple layers, prepared by a multi-stage, sequential polymerization technique of the type described in U.S. Pat. No. 4,180,529. Each successive stage is polymerized in the presence of the previously polymerized stages. Thus, each layer is polymerized as a layer on top of the immediately preceding stage.

To provide a toughened PHA composition that retains good transparency (low haze), the components of the core-shell polymer compound can have refractive indices that match well with the refractive index (RI) of the PHA. The low-modulus interior of the core-shell polymer compound can comprise any elastomeric polymer or copolymer that does not comprise an aromatic vinyl comonomer (such as styrene), preferably comprising polyalkyl acrylate (for example polybutyl acrylate). Polybutyl acrylate rubber has RI of 1.47 and can be suited for the core. The elastomeric polymers are optionally cross-linked.

The core of the core-shell polymer may comprise about 50 to about 90 weight % of the core-shell polymer, based on the total weight of the core-shell polymer.

Core-shell polymers can be obtained commercially, for example, Paraloid® EXL-2330 (with a core prepared from butyl acrylate monomer), Paraloid® EXL-2314 (epoxy functional polymer, with a core prepared from butyl acrylate monomer), and Paraloid® KM-365 (with a core prepared from butyl acrylate monomer) from Rohm and Haas (Philadelphia, Pa.).

For example, if the toughener is EBAGMA, the amount of EBAGMA present can be about 1-2%. Wishing not to be bound by theory, this amount is enough to improve PHA toughness without impairing the optical clarity (such as contact clarity) of a film or sheet made from the PHA composition.

A PHA composition can further comprise one or more additives including plasticizers, stabilizers, antioxidants, ultraviolet ray absorbers, hydrolytic stabilizers, anti-static agents, dyes or pigments, fillers, fire-retardants, lubricants, reinforcing agents such as flakes, processing aids, antiblock agents, release agents, and/or combinations of two or more thereof.

These additives may be present in the compositions, by weight, from 0.01 to 7%, or 0.01 to 5%. For example, the compositions may contain from about 0.5 to about 5% plasticizer; from about 0.1 to about 5% antioxidants and stabilizers; from about 3 to about 20% fillers; from about 0.5 to about 10% nanocomposite; and/or from about 1 to about 20 weight % flame retardants. Examples of suitable fillers include minerals such as precipitated $CaCO_3$, talc, muscovite, montmorillonite, graphite, and vermiculite.

The composition can be produced by mixing the PHA and carboxylic acid till the acid is substantially or even homogeneously dispersed. Other impact modifiers (e.g. ethylene-acrylate copolymers, ionomers, grafting agents) and additives may be also dispersed in the composition. Any mixing methods known in the art may be used. For example, the component materials may be mixed to substantially dispersed or homogeneous using a melt-mixer such as a single or twin-screw extruder, blender, Buss Kneader, double helix Atlantic mixer, Banbury mixer, roll mixer, etc., to give a resin composition.

Alternatively, a portion of the component materials can be mixed in a melt-mixer, and the rest of the component materials subsequently added and further melt-mixed until substantially dispersed or homogeneous. The resulting composition is a concentrate of carboxylic acid in PHA and can comprise, by weight of the composition, 50 to 90, about 50 to about 75, or 60 to 70% PHA and 10 to 50, about 25 to about 50, or 30 to 40% of carboxylic acid such as stearic acid.

A process for increasing the crystallization rate of a composition comprising PHA can comprise, consist essentially of, or consist of first contacting PHA with a nucleator to produce a compound and thermoforming the compound into an article wherein the contacting can be carried out under a condition sufficient to improve the crystallization rate when the composite is thermoformed into an article. The condition to produce the PHA with nucleator should include the care normally applied to the PHA employed such as proper drying the PHA of moisture and melt temperatures and durations low enough to avoid excessive depolymerization. The contacting of nucleator with PHA can include a melt-mixing temperature in the range above the softening point of the PHA and below the depolymerization temperature of the PHA of about 100° C. to about 400° C., about 170° C. to about 300° C., or especially about 180° C. to about 230° C. at an ambient pressure or in the range of 0 to about 60 MPa or 0 to about 34 MPa. The condition creates sufficiently high shear history to disperse the nucleator into small particles and distribute them uniformly through the melted PHA and sufficiently low shear history to avoid excessive loss of PHA molecular weight and its embrittlement. Shear history is the concept of the amount to shear over a duration of time. A melt experiences more shear history when it experiences high shear for a long time than when it experiences high shear for a short time. Similarly a melt experiences more shear history when it experiences medium shear for a time than when it experiences very low shear for a long time. The shear history of plastics processing equipment may be complicated by differing shear rates and duration times within the equipment for example in a size screw extruder producing pellets the screw has low shear rates and long durations within the channels of the screw but high screws rates and low durations between the screw and the walls of the extruder. In general insufficiently high shear history is achieved by use of less than about 2 minutes of mixing from introduce of the ambient temperature ingredients into a heated batch twin blend mixer using rotor blade mixer that may be co- or counter-rotating or the use of at less than 10:1 length to diameter ratio trilobal, co-rotating twin screw extruder using a screw that contains less than 10% length of screw elements that are either kneading blocks or reverse elements, the rest being forward conveying sections. For example, a sufficiently high shear history can result from use of at least 3 minutes on the batch unit and at least 20:1 L:D (length to diameter) ratio on the continuous unit and an excessively high shear history may result from more than 40 minutes in the batch unit or a 50:1 L:D ratio in the continuous unit. Other processing equipment can be used for melt mixing such as a single screw extruder, counter rotating twin screw extruder, or roll mill. Also useful processors may include bilobal twin screw extruders and single screw extruders with mixing torpedoes at the end of the screw. The carboxylic acid may be present in a sufficiently high or ≥0.5% crystallization-improving amount thereby providing heat resistance at 55° C. or above. Not to be bound by theory, if the carboxylic acid is present at too high a level, it may cause the melt blend viscosity and melt strength to be too low for subsequence processing into pellets, sheeting, or thermoformed articles. For example, whereas pellets of a concentrate of carboxylic acid in PHA may be formed via under-water pelletization if the nucleator additive level is less than about 50%, amorphous sheeting requires that level to be less than about 10% for sufficiently high melt strength. Furthermore the size of nucleator particles having unmatched refractive indexes with the PHA may be less than about 500 nm, less than about 300 nm, or even less than 80 nm for low haze. The difficulty of dispersing nucleator to small sizes may increase with amount of nucleator used and its solubility in the PHA. In general more than about 2% nucleator in the PHA may lead to hazy blends. For example, more than 3% or more than about 5% may give too high a level of haze irrespective of the type of mixing used.

The disclosure below uses film as example and is applicable to sheet, which is thicker than film.

Also disclosed is an article comprising or producing from the composition disclosed herein. The composition may be molded into articles using any melt-processing technique suitable for PHA provided the processing into the finished article is done in a manner to achieve low haze with high crystallinity. Commonly used melt-molding methods known in the art to achieve low haze and crystallinity can include injection molding followed by blow molding, profile extrusion molding with stretching, or extrusion blow molding. The compositions also may be melt formed into films by extrusion or calendaring to prepare amorphous cast film. Those cast film that are amorphous may be further thermoformed into articles and structures. "Amorphous" means a sample of PHA that, when heated in a Differential Scanning Calorimeter (DSC) from ambient to 25° C. above its melting point at about 10° C./minute, shows less than about 1 J/g when the melting endotherm "J/g" is subtracted by the crystallization exotherm "J/g". A fast crystallizing sample is one that when amorphous and is heated in the DSC develops >1 J/g in the crystallization exotherm and especially >20 J/g.

The compositions may also be used to form films, rods, profiles, sheets, fibers and filaments that may be unoriented and crystalline and having haze, or unoriented and amorphous semifinished articles, or oriented from the melt such as blown film or at a later stage oriented by heating a nearly amorphous semifinished article such as by injection stretch blown molding or thermoforming.

The compositions may be formed into films or sheets by extrusion through either slot dies to prepare cast films or sheets or annular dies to prepare blown films or sheets followed by thermoforming into articles and structures that are oriented from the melt or at a later stage in the processing of the composition.

To achieve the full benefit clarity and thermal benefit of the nucleator, the making of any amorphous semi-finished article desirably avoid excessive crystallinity and the making of the finished article desirably avoid both insufficient crystallinity and excessively large crystals of PHA for those parts of the article valuing transparency. To avoid excessive crystallinity which may inhibit subsequent forming or stretching of articles and/or introduces large hazy crystals, the making of amorphous sheet or articles of PHA involves using melted PHA more than 20° C. above the peak melting point to provide a controlled or consistent amount of nucleator by avoiding fortuitous nucleators.

The resulting melt desirable is cooled rapidly to the glass transition temperature. For thick profiles, the cooling rate of the interior of the profile may be benefited by use of the coldest temperature practical on the exterior of the article. That temperature is desirably below the glass transition temperature of the PHA. For example, for PHA having a glass transition temperature of about 50° C. and sheeting thickness of about 700μ may benefit from using one-side quenching temperatures of 10° C. whereas 500μ sheet can be made amorphous using 20° C. one-sided quench conditions. Quench temperatures above about 40° C. may not be as useful because the melt contacting such surfaces can cool too slowly and/or stink to such surfaces if the glass transition temperature is about 40° C. The exact minimum temperature may decrease when a PHA is used that is inherently slower at crystallizing or when a lower amount of nucleator is used or when the article is cooled or quenched from all sides versus one side or when the glass transition temperature of the PHA is lower.

In processing the amorphous semi-finished article into a transparent and crystallized sheet, the amorphous article may be first heated by conductive, convective, or radiative heating. With radiative heating, the article is exposed to black-body radiation temperatures ranging from 200° C. to about 700° C. Time in a 230° C. black body radiator may range from about 10 seconds to about 70 seconds, or from 20 seconds to 60 seconds, or 30 seconds to 50 seconds for a 600μ thick profiles heated from both sides. The optimal temperature for the semi-finished article for achieving crystallinity and clarity in the next step is about half way between the glass transition and the melt point for the particular PHA used.

In forming the heated amorphous semifinished article into a finished transparent, crystalline article the semi-finished article may be stretched at sufficiently high speeds and high stretch ratios to cause crystallization and to enable those crystallites to be small enough to not cause haze. Stretch rate may be about 10% to about 1000% per second, or between 20% per second and 600% per second. Stretch ratios may be about 20% (post stretch length is 150% of the pre-stretched dimension) to about 800%, or 50% to 700%, or 100% to 300%. Not wishing to be bound by theory, slow stretch rates may give haze or incompletely formed articles and too high stretch rates may give insufficiently high crystallinity resulting in finished articles which have poor dimensional stability above the glass transition temperature. Low stretch ratios may not induce enough crystallinity within the short time of the thermoforming process or cause haze in the finished article and too high a stretch ratio may cause excessive thinning or tearing of the article. The exact stretch ratio may be higher for unbalanced or one-dimensional stretching or articles which not cooled during the stretching operation such as is the case for vacuum, pressure-assisted, or no physical "plug assistance". Otherwise those parts of the article that are cooled during the stretch operation may experience haze or poor dimensional stability.

The film may be a single layer of the PHA composition (a monolayer sheet) or a multilayer film or sheet comprising a layer of the PHA composition and at least one additional layer comprising a different material.

For packaging applications, a multilayer film may involve three or more layers including an outermost structural or abuse layer, an inner or interior barrier layer, and an innermost layer making contact with and compatible with the intended contents of the package and capable of forming any needed seals. Other layers may also be present to serve as adhesive layers to help bond these layers together. The thickness of each layer can range from about 10 to about 200 μm.

The outermost structural or abuse layer may be prepared from the PHA composition. Additional structure layers may include oriented polyester or oriented polypropylene, but can also include oriented polyamide (nylon). The structure layer can be printed, for example, by reverse printing using rotogravure methods.

The inner layer can include one or more barrier layers to reduce the permeation rate through the layer by agents such as water, oxygen, carbon dioxide, electromagnetic radiation such as ultraviolet radiation, and methanol that potentially can affect the product inside therein. Barrier layers can comprise, for example, metallized polypropylene or polyethylene terephthalate, ethylene vinyl alcohol, polyvinyl alcohol, polyvinylidene chloride, aluminum foil located so as not to interfere with the optical value of the PHA such as to read-through to the print layer, silicon oxides (SiOx), aluminum oxide, aromatic nylon, blends or composites of the same as well as related copolymers thereof.

The innermost layer of the package can be the sealant and can be a polymer layer or coating that can be bonded to itself (sealed) or other film or substrate at temperatures substantially below the melting temperature of the outermost layer. Sealants are well known and can be commercially available from E. I. du Pont de Nemours and Company (DuPont), Wilmington, Del. Substrate can include foil, paper or non-woven fibrous material.

A multilayer film can be produced by any methods well known to one skilled in the art such as, for example, coextrusion and can be laminated onto one or more other layers or substrates. Other suitable converting techniques are, for example, blown film (co)extrusion and extrusion coating.

Films can be used to prepare packaging materials such as containers, pouches and lidding, balloons, labels, tamper-evident bands, or engineering articles such as filaments, tapes and straps.

The article can be in other forms such as shaped articles or molded articles. Containers and packaging materials can be of various shapes including trays, cups, caps, bowls, or lids prepared from sheets by vacuum or pressure forming. Other shapes include those prepared by deep drawing an unstretched sheet (i.e. thermoforming), by extrusion blow molding or biaxial stretching blowing parisons (injection stretch blow molding), by injection molding, compression molding or other molding processes; profile extruded articles; carton; squeezable tubes, pouches or bottles; components of containers; bags or pouches within a rigid container that dispense liquids such as wine, medical fluids, baby formula; clam shells, and blister packs.

A film or sheet could be thermoformed to produce a concave surface such as a tray, cup, can, bucket, tub, box or bowl. Thermoformed articles may be combined with additional elements, such as a generally planar film sealed to the thermoformed article that serves as a lid (a lidding film).

Products that can be packaged include food and non-food items including beverages (e.g., carbonated beverages, orange juice, apple juice, grape juice, other fruit juices and milk), solid foods (e.g., meats, cheese, fish, poultry, nuts, coffee, applesauce or other sauces, stews, dried fruit, food paste, soups and soup concentrates and other edible items), spices, condiments (e.g., ketchup, mustard, and mayonnaise), pet food, cosmetics, personal care products (e.g., toothpaste, shaving foam, soaps, shampoos, lotions and the like), pharmaceuticals, fragrances, electronic components, industrial chemicals or household chemicals (e.g., laundry detergent, fabric softener), agrochemicals, medical devices and equipment, medicinal liquids, fuels, and biological substances.

Films may also be slit into narrow tapes and drawn further to provide slit film fibers for use as degradable sutures.

The following Examples are merely illustrative, and are not to be construed as limiting the scope of the invention described and/or claimed herein.

EXAMPLES

The example illustrates the invention in making thermoformed cups.

Materials

PLA2002D was purchased from NatureWorks LLC (Minnetonka, Minn. USA) and had a melt viscosity about 1500 Pa·s at 190° C. and 100 s$^{-1}$.

Stearic acid was obtained from Aldrich (Batch 11821 LC) 95% pure.

Palmitic acid was obtained from City Chemical LLC (Connecticut) (P4188) 99% pure.

Behenic acid was obtained from Aldrich Chemical Company (No. 216941-5G) 99% pure.

Talc #1 was nominally 10-μ talc from Aldrich (No. 243604-25G).

Butyl stearate (Catalogue #B2188), 2-ethylhexyl stearate (Catalogue #327-27622-914) and stearyl stearate (Catalogue #324-27632-916) were obtained from City Chemical.

Zinc stearate (catalogue #557-05-1) was obtained from City Chemical.

Analytical Equipment and Methods

Batch blending was accomplished on a Haake Rheocord 9000 using roller blade rotors and a 55 g mixing chamber operated by preheating the unit to goal melt temperature, then running rotors, starting the clock, charging about 55 g of ingredients within about a 15 second period, closing the lid, and recording the torque, time, and melt temperature. When complete the melt mass was discharged onto a cold container, cooled to ambient and sealed.

Continuous melt blending and amorphous sheet extrusion accomplished on a Werner&Pfleiderer (W&P) 28 mm trilobal twin screw extruder with coat hanger die and quench drum. The extruder used an 830 mm long screw. Pellets and additives entered about 70 mm from the top of the screw as a solid mixture. The screw used forward conveying segments for most of its length and about 20% of its length used kneading blocks. The unit was run at 125 rpm with a melt temperature of 190° C. to 210° C. The melt passed through a coat hanger die (20 cm width and a 0.76 mm die gap) at about 10 kg/hr to 20 kg/hr using a Foremost volumetric pellet feeder. The melt curtain fell vertically about 5 cm to a quench drum cooled to 10° C. to 23° C. The drum rotation speed was set to minimum melt draw. Sheet thickness was controlled between about 250 micron and about 750 micron by varying the throughput rate of the polymer feed.

DSC was a TA Instruments (New Castle, Del.) Model Q1000 and operated on about 9 mg of sample with 10° C./minute heating from ambient to either 200° C. or 250° C., cooling 10° C./minute to about 10° C., and reheating similarly. Exotherms and endotherms were quantified in terms of J/g and temperature of maximum heat flow rate. Any exotherm in the vicinity of 100° C. to 140° C. during the first heat could represent crystallization of PLA2002 from the cool amorphous state. Such crystallization could be induced by deliberately added nucleators (carboxylic acids) or fortuitous nucleators formed from PLA2002D itself during lengthy storage of the sample or from a slow cooling during the original formation of the sample. Fortuitous nucleators were undesirable because their presence and effect on crystallization is unpredictable or not consistent. A certain amount of such crystallization was believed useful for thermoformed cups. For example, the unoriented areas (cup base and top) could thermally benefit from crystallization during exposure to heating required for forming. Excessively fast crystallization however might result in cups only partly thermoforming because they might crystallize fully before reaching the shade of the mold. The endotherm in the vicinity of 145° C. to 155° C. could represent the melting of crystals of PLA2002D that were present in the original sample and formed during the heat up. The sample was heated to 200° C. to melt most fortuitous nucleators. Samples were also heated to 250° C. to better ensure melting of the fortuitous nucleators and to assess whether the nucleator depolymerizes PLA2002D. During the cool down there could be a crystallization exotherm in the vicinity of 90° C. to 130° C. If there was excessively fast crystallization of this type it could be more difficult to make amorphous sheets that were thick (greater than about 600 μm). The second heat-up in the DSC unit was used to evaluate deliberately added nucleators since the fortuitous PLA2002D nucleators were assumed to have been melted at 200° C. and especially at 250° C. As such being the case the exotherm and endotherm during the second heat usually had lower heat-flow values.

Haze was assessed using ASTM D1003 rev 92. The haze is reported is "internal haze", which means any surface roughness effecting haze is minimized by a liquid lubricating coating. The samples tested for haze were made amorphous in their PHA content by rapidly cooling the 250μ to 750 micron thick extruded melt curtain on a quenching drum cooled to 10° C. to 23° C. Alternatively, thick samples of sheeting or samples from batch blends were compression molded at 190° C. into 254μ thick molds using a 2 minute long mold and hold cycle. The molds were immediately transferred and rapidly cooled in water cooled molds. The haze data is reported with corresponding thicknesses.

Run 1: This was a comparative example where 55 g of PLA2002D, without stearic acid, was processed in a Haake at 125 rpm and 210° C. melt temperatures, for 10 minutes.

Run 2: 54 g of PLA2002D was processed as in Comparative Run 1 except an additional 0.2 g of stearic acid was added.

Run 3: 54 grams of PLA2002D was processed as in Comparative Run 1 except an additional 1 g of stearic acid was added.

Run 4: 53.9 g of PLA2002D was processed as in Comparative Run 1 except 1.1 g of palmitic acid was added and the mixing time was 6 minutes.

Run 5: 53.9 g of PLA2002D was processed as in Run 4 except 1.1 g of behenic acid was added.

Run 6: 53.9 g of PLA2002D was processed as in Run 4 except 1.1 g of behenic acid #2 was added.

Run 7: 55 g of PLA2002D was processed as in Run 4 except 1.1 g of talc #1 was added and the blending was accomplished at 190° C. over 2 minutes after ingredients reached melt temperature.

The amorphous blends of the above were transparent except those of Run 7.

Run 8: PLA2002D was processed continuously into amorphous sheeting using a W&P 28 mm extruder.

Run 9: The process was as Run 8 except the feed was a solid mixture of PLA2002D and 1% stearic acid.

Run 10: The process was as Run 8 except the feed was a solid mixture of PLA2002D and 2% stearic acid.

Run 11: The process was as Run 4 except the feed was a solid mixture of PLA2002D and 2% butyl stearate.

Run 12: The process was as Run 4 except the feed was a solid mixture of PLA2002D and 2% 2-ethylhexyl stearate.

Run 13: The process was as Run 4 except the feed was a solid mixture of PLA2002D and 2% stearyl stearate.

Run 14: The process was as Run 8 except the feed was a solid mixture of PLA2002D and 2% stearamide. The amorphous sheeting tested in the DSC unit was about 560 micron thick. Haze was conducted on samples of sheet compression molded to 254 micron thickness.

Run 15: The process was as Run 14 except the feed was a solid mixture of PLA2002D and 2% zinc stearate.

Run 16: The process was as Run 4 except the feed was a solid mixture of PLA2002D and 2% stearyl alcohol.

The blends are summarized in the following table. In the table, "1st exo" (exotherm) is the area under the crystallization exotherm when plotting "heat flow" versus increasingly high temperature; "xal" temperature denotes temperature at which there was the highest exothermic heat flow, that is the crystallization temperature during for the heating of the amorphous sample; the "$1^{st}$ endo" (endotherm) is the area under the melting endotherm when plotting "heat flow" versus increasingly high temperature; "melt T" is the temperature of maximum heat flow associated with the melting endotherm; "$2^{nd}$ exo" is the area under the crystallization exotherm that occurred after the sample had first been heated to 200° C. or 250° C. and cooled to ambient, the "max temp" is the temperature for maximum heat flow of the $2^{nd}$ exotherm; "$2^{nd}$ endo" is the melting point of the sample when it is melted during the second heat-up cycle. There could be some overlap between the end of the $2^{nd}$ exotherm and the start of the $2^{nd}$ endotherm; therefore the uncertainty in the J/g values was about +/−10%. Haze for runs 1 and 2 was not determined according to the ASTM method, but was visually determined to be good. Higher values for cool-down crystallization endotherm indicate that a PLA melt that was being quenched into an amorphous sheet might experience partial crystallization during the quenching process. If the pre-thermoformed sheet of PLA was partly crystalline, then the sheet may thermoform poorly (a partly crystalline sheet may not fully form into an article unless heated to a higher temperature). Higher values for second heat crystallization exotherms indicate a trend toward greater extent of full crystallization for unoriented or slightly oriented parts of a thermoformed article during the heat history for the thermoforming process. Low values indicate that unoriented or slightly oriented portions of a thermoformed article may remain amorphous and be susceptible to dimensional instability if heated for a period of time above the Tg of the PLA. Very high values of the second heat crystallization exotherm, or high values for the sum of the cool-down and heat-up exotherms, indicate poor thermoformability due to crystallization during the forming process. Such crystallization, if only slight, may impart haze on the article. Higher levels of crystallization may retard the full thermoforming of the article. High second-heat melting endotherms indicate a combination of fast crystallization during cool-down and during heat-up.

| Run | $1^{st}$ exo J/g | xal T (° C.) | $1^{st}$ endo J/g | Melt T (° C.) | Max T (° C.) | $2^{nd}$ exo (J/g) | $2^{nd}$ endo (J/g) | xal T (° C.) | Haze (%) | mil |
|---|---|---|---|---|---|---|---|---|---|---|
| 1 | 7 | 128 | 8 | 152 | 250 | 0 | 0.5 | none | | |
| 2 | 12 | 126 (2) | 13 | 151 | 250 | 0 | 2 | none | | |
| 3 | 29 | 102 (26) | 32 | | 250 | 28 | 28 | 122 | 3.6 | 10 |
| 4 | 28 | 108 (20) | 14 | 147:152 | 250 | 0 | 8 | none | 3.4 | 10 |
| 5 | 23 | 104 (24) | 33 | 147:152 | 250 | | | | | |
| 6 | 33 | 111 (17) | 28 | 145:155 | 250 | 33 | 30 | 109 | 12 | 10 |
| 7 | 24 | 115 (13) | 24 | 149 | 200 | 23 | 27 | 112 | high | 10 |
| 8 | 4 | 123 (5) | 4 | | 200 | 0 | 0.5 | none | 1.8 | 13 |

-continued

| Run | 1st exo J/g | xal T (° C.) | 1st endo J/g | Melt T (° C.) | Max T (° C.) | 2nd exo (J/g) | 2nd endo (J/g) | xal T (° C.) | Haze (%) | mil |
|---|---|---|---|---|---|---|---|---|---|---|
| 9  | 31 | 115 (13) | 31 | 150 | 200 | 23 | 23 | 115 | 1.3 | 17 |
| 10 | 30 | 104 (24) | 32 | 149 | 200 | 30 | 32 | 107 | 1.1 | 16 |
| 11 | 27 | 96 | 30 | 147:152 | 250 | 31 | 30 | 115 | 5.5 | 10 |
| 12 | 25 | 105 | 29 | 147:152 | 250 | 28 | 29 | 118 | 7.3 | 10 |
| 13 | 25 | 116 | 25 | 150 | 250 | 5 | 5 | 131 | 76 | 10 |
| 14 | 25 | 104 | 27 | 147:152 | 250 | 20 | 27 | 104 | 7 | 10 |
| 15 | 40 | 102 | 42 | 144:153 | 200 | 41 | 42 | 109 | 47 | 10 |
| 16 | 28 | 112 | 13 | 145:152 | 250 | 14 | 28 | 128 | | |

The invention claimed is:

1. A composition comprising or produced from poly(hydroxyalkanoic acid), a nucleator, a core shell polymer, and optionally an ethylene copolymer wherein
the poly(hydroxyalkanoic acid) comprises a poly(lactic acid) having a melting point of from 145° C. to 155° C.;
the poly(lactic acid) comprises monomers derived from L-lactic acid and D-lactic acid;
a sample of the composition, when heated in a Differential Scanning Calorimeter from ambient temperature to 25° C. above its melting point at about 10° C./minute, develops >1 J/g in the crystallization exotherm;
the nucleator is a carboxylic acid and is present in the composition from 0.5 to about 15% based on the weight of the composition; and the carboxylic acid includes aromatic carboxylic acid, aliphatic carboxylic acid, polycarboxylic acid, aliphatic hydroxycarboxylic acid, or combinations of two or more thereof; and if the composition comprises the ethylene copolymer, the carboxylic acid is optionally in the form of an alkyl ester, alkyl amide, or combinations thereof; and
the core/shell polymer does not comprise a vinyl aromatic comonomer and has a refractive index not greater than 1.5; the core is alkyl acrylate polymer.

2. The composition of claim 1 wherein
the core of the core-shell polymer comprises an alkyl acrylate polymer; and
the shell of the core-shell polymer comprises a polymethyl methacrylate and optionally comprising functional groups including epoxy, carboxylic acid, amine, or combinations of two or more thereof.

3. The composition of claim 2 wherein the alkyl acrylate polymer is cross-linked.

4. The composition of claim 1 wherein the composition further comprises an ethylene copolymer.

5. The composition of claim 4 wherein the ethylene copolymer is a dipolymer.

6. The composition of claim 5 wherein the ethylene copolymer is an ethylene glycidyl methacrylate dipolymer.

7. The composition of claim 6 wherein the nucleator is stearic acid, its alkyl ester, its alkyl amide, or combinations of two or more thereof.

8. The composition of claim 1 wherein the composition is produced from a concentrated master batch comprising 10 to 50% of stearic acid and about 50 to 90% of poly(hydroxyalkanoic acid) by mixing the concentrated master batch with more poly(hydroxyalkanoic acid) and or the core-shell polymer.

9. The composition of claim 1 wherein the poly(lactic acid) is a copolymer of lactic acid and glycolic acid.

10. A process comprising contacting a poly(hydroxyalkanoic acid) composition with a nucleator and core shell polymer to produce the composition of claim 1; producing a film or sheet from the composition; and thermoforming the film or sheet into an article wherein during the thermoforming, the crystallization of the poly(hydroxyalkanoic acid) is increased.

11. The process of claim 10 wherein the nucleator is present in the composition from 1.2 to about 10%, based on the weight of the composition of the poly(hydroxyalkanoic acid).

12. The process of claim 11 wherein the carboxylic acid includes lauric acid, palmitic acid, stearic acid, behenic acid, erucic acid, oleic acid, linoleic acid, or combinations of two or more thereof.

13. The process of claim 11 wherein the carboxylic acid is stearic acid and the thermoforming is carried out at a temperature in the range of about 160° C. to about 400° C. and a pressure in the range of 0 kPa to about 60 MPa.

14. An article comprising or produced from a composition wherein the article includes film, sheet, molded article, or combinations of two or more thereof and the composition is as recited in claim 1.

15. The article of claim 14 wherein
the article is film or sheet; and
the nucleator is present in the composition from 1.2 to about 10% and is stearic acid.

16. The article of claim 14 wherein the composition further comprises an ethylene copolymer; and the ethylene copolymer is a dipolymer.

17. The article of claim 14 wherein the article is a thermoformed article and the article is transparent.

18. The article of claim 17 wherein the article is tray, cup, cap, bowl, or lid.

* * * * *